United States Patent [19]

Kaufman et al.

[11] 3,872,192

[45] Mar. 18, 1975

[54] WET PROCESS FOR COMPOUNDING POLYMER-SOLIDS COMPOSITIONS

[75] Inventors: Martin H. Kaufman; Edward M. Roy, both of China Lake, Calif.

[73] Assignee: The United States of America as represented by the Secretary of the Navy, Washington, D.C.

[22] Filed: Aug. 7, 1970

[21] Appl. No.: 69,512

[52] U.S. Cl. .............. 264/3 B, 149/19.3, 149/19.9, 149/19.91, 149/42, 149/44, 149/76, 149/87, 149/92
[51] Int. Cl. ............................................ C06b 21/02
[58] Field of Search ....... 264/3 R, 3 A, 3 B; 149/18, 149/20, 19.3, 19.9, 19.91, 42, 44, 76, 87, 92

[56] References Cited
UNITED STATES PATENTS

| | | | |
|---|---|---|---|
| 3,148,229 | 9/1964 | Bordenkircher et al. | 264/3 B |
| 3,354,010 | 11/1967 | Hopper et al. | 264/3 A |
| 3,509,243 | 4/1970 | Moore | 264/3 R |

*Primary Examiner*—Stephen J. Lechert, Jr.
*Attorney, Agent, or Firm*—R. S. Sciascia; Roy Miller; Lloyd E. K. Pohl

[57] ABSTRACT

A wet process for compounding polymers which comprises forming a paste consisting of solid ingredients such as oxidizers and metal powder, a rubber polymer and low boiling hydrocarbon; extruding said paste through a plastic or metal tube provided with a multi-perforated nozzle and a plastic plunger whereby strands are formed; and dropping said strands through a current of warm air or warm inert gas whereby said strands are dry to the touch as they fall to the bottom of said cylinder. This process provides compositions which are homogeneous and the solid ingredients are retained within the polymer-solid composition.

5 Claims, 1 Drawing Figure

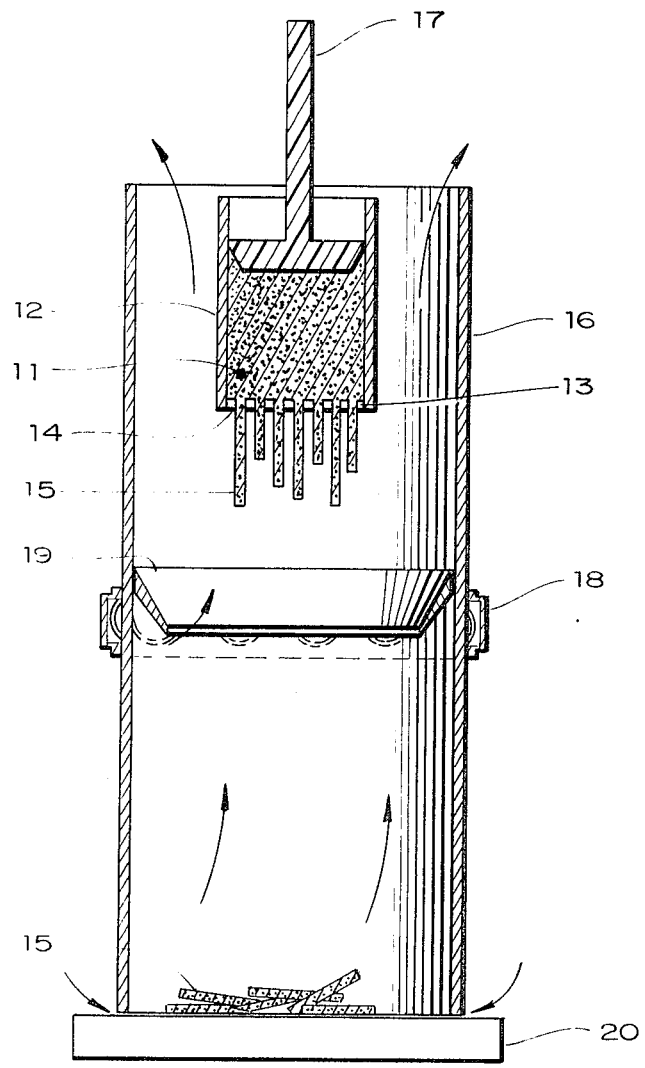

WET PROCESS FOR COMPOUNDING POLYMER-SOLIDS COMPOSITIONS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

A wet process for compounding polymer-solid compositions.

Common methods of compounding elastomers involves the addition of solid ingredients to the elastomer on a mill or mixing all ingredients together in a Banbury mixer. Such methods are not appropriate when the ingredients are sensitive to heat and when the polymer will not band on a mill. Another method common to the art of compounding polymers is to dissolve the polymer in a solvent and add the other ingredients to form a suspension. The suspension is then mixed with a liquid in which neither the polymer nor the compounding ingredients are soluble. Often the polymer precipitates resulting in inhomogeneous agglomerates of the polymer with the solid compounding ingredients which can lead to unreliability. The present method provides a means for compounding polymers which have reliable composition and homogeneity in the overall formulation.

BRIEF DESCRIPTION OF THE DRAWING

The single FIGURE is a diagrammatic illustration in a sectional view of an apparatus which can be used in the present new and improved process.

DESCRIPTION OF THE INVENTION

In accordance with the present invention a mixture of butyl rubber with 5 to 15 parts of hexane was compounded with as much as 95 parts solid ingredients per 5 parts butyl rubber in a common mixer. The resulting paste mixture passed through an apparatus diagrammatically shown in the single FIGURE wherein said paste 11 was pushed into tube 12 which is provided with plunger 17 and at low pressure extruded through nozzle 13 which is provided with multiperforations 14 thereby forming spaghetti-like strands 15. Tube 12 is positioned in an open cylinder 16 which is provided with a heating coil 19 which warms the current of air moving past the strands 15 and dries them as they fall onto a collector 20 which is a movable tray mounted at the base of said cylinder 16. A breaker plate 19 is suitably secured to the wall of cylinder 16 to prevent strands 15 from entering the hot zone.

Butyl rubber and ethylene-propylene polymers are very impermeable and, therefore, it is necessary to reduce the cross-sectional area of the composition so as to facilitate the removal of the solvent. This is done by pushing the paste through a small cross-sectional die by means of a plastic plunger and by providing a continuous movement of warm air in the cylinder through which the strands are dropped onto the collector.

The invention is further illustrated by the following examples.

EXAMPLE I

To a solution of 20 grams of butyl rubber in 160 ml of low boiling petroleum ether 80 grams of ammonium perchlorate was mixed in a sigma blade mixer. The resulting paste was placed in a polyethylene tube provided with a nozzle having a plurality of orifices of equal size and evenly spaced on its face. The tube was positioned at the top of an open ended cylinder provided with warm air circulating therethrough and having a collector positioned at the other end. By means of a press the paste was pressed through the nozzle orifices whereby spaghetti-like strands were formed which fell through the heated air to the collector. The strands were dry to the touch and did not stick to each other. No surface ammonium perchlorate was evident. An analysis of random samples of this material proved it to be very homogeneous.

EXAMPLE II

The same process was repeated with ethylene-propylene dissolved in hexane and mixed with magnesium powder and polytetrafluoroethylene powder. The ratio of ethylene-propylene weight to hexane volume to solids weight was 5:30:95. The strands of extruded paste contained no solids on the surface, was dry to the touch, and its analysis after drying out the solvent conformed to the original mix composition. Random samples had essentially the same composition.

EXAMPLE III 10 grams of Viton (copolymer of vinylidene fluoride and perfluoropropene) were dissolved in 80 ml of acetone. 20 grams of aluminum and 5 grams of polytetrafluoroethylene powder and 65 grams of ammonium perchlorate were mixed into the solution. Extrusion of this paste resulted in surface dry strands which after further evaporation at room temperature and atmospheric pressure resulted in a material which was homogeneous, had the same composition as the starting mix, and which could be chopped into powder by means known to the art for increasing the bulk density.

EXAMPLE IV

A solution of 15 grams of butyl rubber dissolved in 90 ml of low boiling petroleum ether was used to prepare a paste with 85 grams of cyclotrimethylenetrinitramine (RDX). The resultant dry composition was homogeneous and had the same composition as originally prepared.

EXAMPLE V

A solution of 15 grams of butyl rubber dissolved in 90 ml of benzene was used to prepare a paste with about 85 grams of cyclotrimethylenetrinitramine (RDX). The resulting composition was dry and had the same composition as the starting mix.

The process disclosed herein may be used for the preparation of any compounded (or loaded) polymer which is soluble in a volatile solvent. The quantity of loading, i.e., solids in polymer may range from about 5 percent to about 95 percent loading. The size of the orifices of the extruder die are limited by the maximum diameter of the solid particles incorporated into the polymers.

The solids dispersed in the rubber matrix comprise ammonium perchlorate, ammonium nitrate, potassium perchlorate, aluminum, magnesium, and polytetrafluoroethylene (Teflon) and the copolymer of vinylidene flouride and perfluoropropene.

What is claimed is:

1. A process for compounding polymer-solids compositions which comprises the steps of:
   a. forming a solution by dissolving a polymer which is soluble in a volatile solvent which will dissolve the polymer;
   b. forming a paste by adding solid particles selected from the group consisting of solid oxidizer particles, solid metal particles, solid high explosive particles, solid fluorocarbon particles and mixtures thereof to said solution;
   c. extruding said paste through a die having a diameter at least as large as the maximum diameter of said solid particles; and
   d. passing the extruded paste through a current of warm air.

2. The process according to claim 1 wherein the paste consists essentially of butyl rubber in a low boiling hydrocarbon and ammonium perchlorate.

3. The process according to claim 1 wherein the paste consists essentially of ethylene-propylene dissolved in hexane, magnesium powder, and polytetrafluoroethylene.

4. The process according to claim 1 wherein the solids consist essentially of the copolymer of vinylidene fluoride and perfluoropropene, aluminum, polytetrafluoroethylene and ammonium perchlorate.

5. The process according to claim 1 wherein the paste consists essentially of butyl rubber dissolved in low boiling petroleum ether and cyclotrimethylenetrinitramine.

* * * * *